United States Patent [19]

Takakusaki et al.

[11] Patent Number: 4,915,992
[45] Date of Patent: Apr. 10, 1990

[54] PARISON FOR STRETCH MOLDING

[75] Inventors: Nobuyuki Takakusaki, Yokohama; Kohei Shimojima, Tokyo, both of Japan

[73] Assignee: Toyo Seikan Kaisha, Ltd., Tokyo, Japan

[21] Appl. No.: 241,613

[22] Filed: Sep. 8, 1988

[30] Foreign Application Priority Data

Sep. 11, 1987 [JP] Japan .................. 62-227665

[51] Int. Cl.$^4$ ........................... B65D 1/00
[52] U.S. Cl. .................. 428/36.92; 215/1 C; 428/213; 428/542.8
[58] Field of Search .......... 428/36.92, 36.7, 35.7, 428/542.8, 213; 215/1 C

[56] References Cited

U.S. PATENT DOCUMENTS 4,483,891 11/1984 Cerny .................. 428/542.8
4,725,464 2/1988 Collette .................. 428/542.8

Primary Examiner—James J. Seidleck
Attorney, Agent, or Firm—Kenyon & Kenyon

[57] ABSTRACT

A parison for stretch molding comprising a side wall which forms a barrel portion of a hollow vessel during blow molding, a bottom wall which continues from the side wall and forms the bottom wall of the vessel during the blow molding, and a padding portion which is gradually made thin outward in the radial direction substantially from the central portion of the bottom wall and which is provided in the internal periphery of the bottom wall. The parison can therefore prevent the thickness of the bottom of the vessel from being too small after blow molding of th parison, but achieve sufficient strength without using any excessive material and achieve and improvement in productivity of the parison by increasing the cooling efficiency thereof.

2 Claims, 7 Drawing Sheets

FIG.5
FIG.6
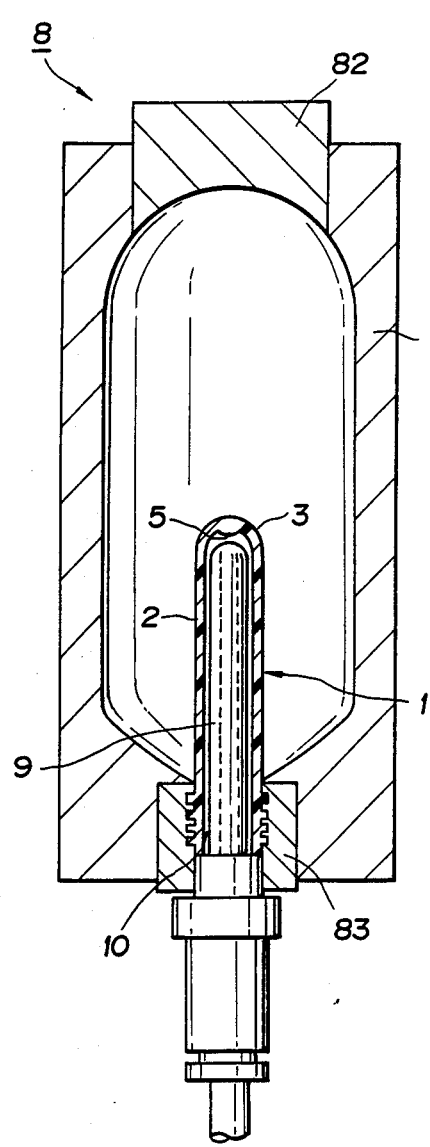
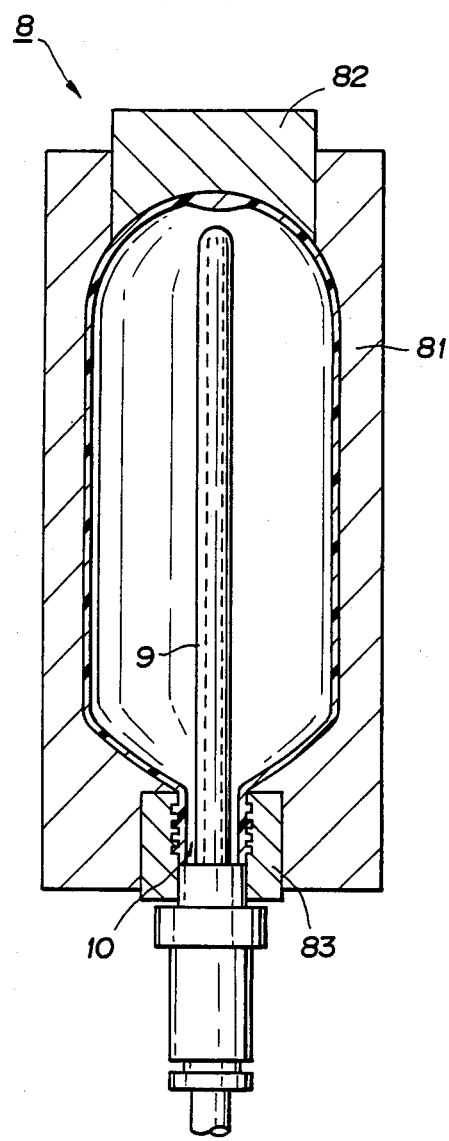

PARISON FOR STRETCH MOLDING

BACKGROUND OF THE INVENTION

The present invention relates to a parison for stretch molding which is preliminarily formed for blow molding of vessels such as plastic bottles and so on, and particularly to a closed-end parison.

Plastic bottles such as PET vessels (vessels made of polyethylene terephthalate resin) have been generally molded by preliminarily forming a parison 100 as shown in FIG. 11 and blow molding in which the parison 100 is expanded by blowing compressed air therein to form as a final product the hollow vessel B shown in FIG. 12.

The parison 100 has a closed-end cylindrical form having a cylindrical side wall 101 which forms the barrel portion B1 of the vessel B and a bottom wall 102 which forms the bottom portion B2 of the vessel B and is formed by injection molding. The thickness of each of the side wall 101 and the bottom wall 102 is so determined that the thickness of the vessel B as a final product is a required dimension. In other words, since the vicinity of the bottom wall 102 of the parison 100 becomes thin as a result of stretch molding during blow molding, the whole of the bottom wall 102 is made thick, as shown in FIG. 13. Therefore, an excessive amount of a material is present at the bottom of the conventional container.

However, in such a conventional container, since the thickness of the whole of the bottom wall 102 of the parison 100 is large, the cost of materials is large. In addition, since the large thickness deteriorates the cooling efficiency of the resin of the parison 100 during injection molding, the molding of the parison 100 takes a long time, and the efficiency of the production is poor, resulting in the presence of a limiting factor in the mass-production of the vessel.

If the thickness of the bottom wall 102 is reduced in order to solve the aforementioned problems, as shown in FIG. 14, although the amount of the material used is less and the cooling efficiency is increased, portions B2′ in the vicinity of the bottom B2 of the vessel B becomes thin after blow molding, as shown in FIG. 16, resulting in a reduction in strength and the danger of easy damage due to falling of the vessel B, etc.

When the state of the bottom wall 102 of the parison stretched during blow molding was investigated, it was found that since a portion near the center 0′ of the bottom wall 102 was hardly stretched, as shown in FIG. 15, a portion near the center 0′ of the bottom B2 of the vessel B was thus made brittle and the area around of the center became thin, resulting in a decrease in strength.

SUMMARY OF THE INVENTION

It is an object of the present invention to solve the aforementioned problems of the prior art and to provide a parison for stretch molding which can prevent the thickness of part of the bottom of a vessel from being small after blow molding of the parison but achieve sufficient strength without using any excessive material, and achieve an improvement in productivity of the parison by increasing the cooling efficiency thereof.

In order to achieve the above-described object and other objects, the parison for stretch molding of the present invention is characterized by comprising a cylindrical side wall which forms the barrel portion of a hollow vessel during blow molding, a bottom wall which forms the bottom portion of the vessel that continues from the side wall during the blow molding, and a padding portion in which the thickness gradually decreases radially from the center of the bottom wall toward the outside.

The aforementioned configuration has the tendency that the bottom wall of the parison is outwardly stretched in a radial direction thereof during blow molding so that the vicinity of the center of the bottom wall is partially stretched to a greater degree than the peripheral portion thereof and is thus partially made thin. However, the decrease in the thickness is compensated for by performing blow molding in such a manner that the padding portion is provided in the vicinity of the center so that a decrease in the thickness of the bottom of the vessel after blow molding can be prevented.

A preferred embodiment of the present invention is described in detail below with reference to the attached drawings.

BRIEF DESCRIPTION OF THE DRAWINGS

FIGS. 5 and 6 are schematic longitudinal sections showing a process of blow molding of a vessel using the prison shown in FIG. 2;

DESCRIPTION OF THE PREFERRED EMBODIMENTS

Figure 1:
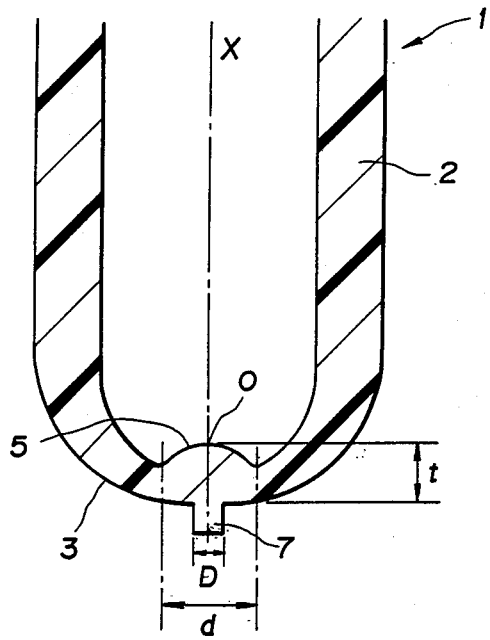
FIG. 1 is a longitudinal sectional view of the bottom of a parison to which an embodiment of the present invention relates.
Figure 2:
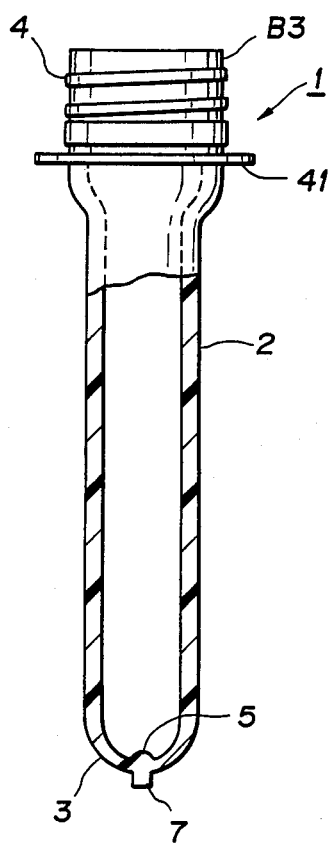
FIG. 2 is a partially cut-away front view of the whole of the parison shown in FIG. 1.
Figure 12:
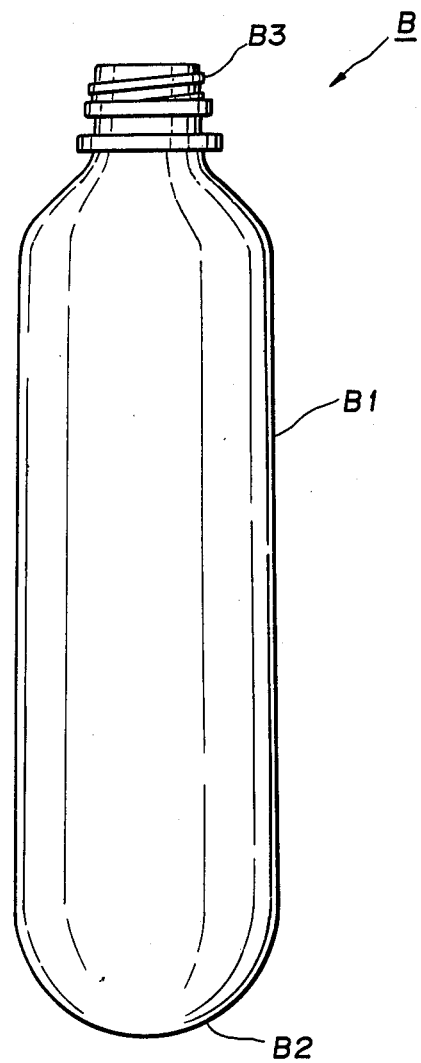
FIG. 12 is a front view of a vessel molded by using the parison shown in FIG. 11.
Figure 11:
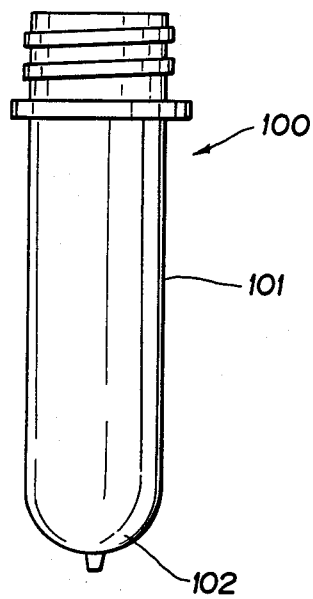
FIG. 11 is a front view of a conventional prison.

FIGS. 1 to 3 show a parison to which an embodiment of the present invention relates. In this embodiment, blow molding of the same vessel B as the conventional vessel shown in FIG. 12 is performed. A parison 1 is made of, for example, thermoplastic resin such as polyester, and has the form of substantially a closed-end cylinder comprising a cylindrical side wall 2 which forms the barrel portion B1 of the vessel B and a bottom wall 3 which forms the bottom B2 of the vessel B and which continues from the side wall 2. A neck portion B3 of the vessel 3 is formed at the open end of the side wall 2. The neck portion B3 comprises a screw portion 4 on which a cap (not shown) of the vessel B is screwed and a flange portion 41 which is provided below the screw portion 4.

The bottom wall 3 of the parison 1 is so rounded that the sectional form thereof is a circular arc and has inner and outer surfaces each having a semispherical form. The thickness of each of the side wall 2 and the bottom wall 3 of the prison 1 is so determined that the thickness of the vessel B after blow molding is of a given dimension. A padding portion 5 in which the thickness thereof is gradually decreased from the center 0 (the intersection of the axis X of the parison 1 and the bottom wall 3) of the bottom wall 3 toward the outside in the radial direction is provided in the inner surface of the bottom wall 3 so as to project therefrom. In other words, the padding portion 5 projects in a wave-like sectional form in the parison 1 and is gradually becomes thinner from a maximum thickness at the center 0 of the bottom wall 3 toward the outside in the radial direction thereof. The thickness t, the diameter d and the curvature of the padding portion 5 are determined by the shape and the size of the vessel B to be blow-molded, i.e., the diameter and the thickness of the bottom B2 of the vessel B and the length of the barrel portion B1 of the vessel B, etc. It is also preferable that the thickness of the padding portion 5 of the bottom wall 3 is less than that of the maximum thickness of the parison, and it is necessary that the diameter d thereof is greater than the diameter D of a sprue or burr 7.

Figure 3A:
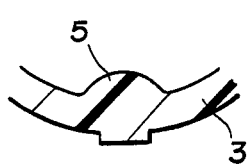
FIGS. 3(A) to 3(C) are partial longitudinal sections of other forms of the padding portion of the parison shown in FIG. 1.
Figure 3B:
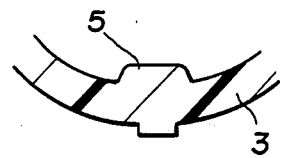
Figure 3C:
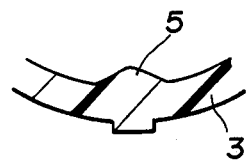

As a matter of course, the shape of the padding portion 5 is not limited to the above-described wave-like form, and for example, various shapes such as the forms of a circular arc, a trapezoid and a cone shown in FIGS. 3(A) to 3(C) can be selected.

Figure 4:
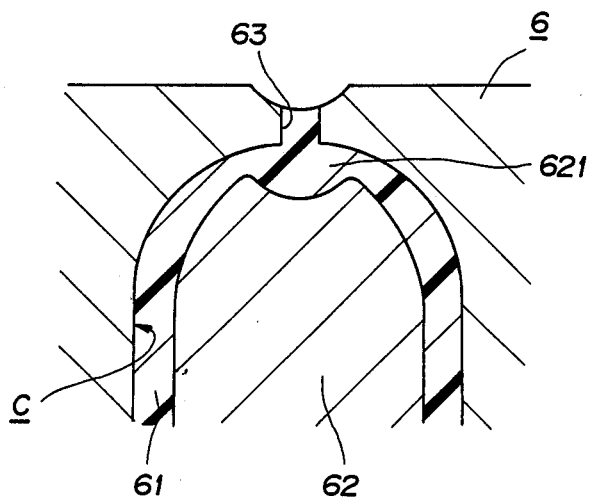
FIG. 4 is a longitudinal sectional view of the bottom showing injection molding of the parison shown in FIG. 2.

FIG. 4 shows an example of a method of producing the parison 1. In a mold 6 used for injection molding, a core 62 corresponding to the internal periphery of the parison 1 in a concave portion 61 corresponding to the external periphery of the parison 1, and a cavity C into which a molten resin material is injected is formed between the internal periphery of the concave portion 61 and the external periphery of the core 62. A gate 63 through which the molten resin material is injected from an injection molding machine (not shown) is formed so as to open at the back end of the concave portion 61, i.e., on the side of the bottom wall 3 of the parison 1 to be molded. A concave portion 621 corresponding to the padding portion 5 which is provided in the internal periphery of the parison 1 is provided in the core 62. Therefore, when the shape of the padding portion 5 is changed into, for example, the shapes shown in FIGS. 3(A) to 3(C), the core alone may be changed.

Figure 13:
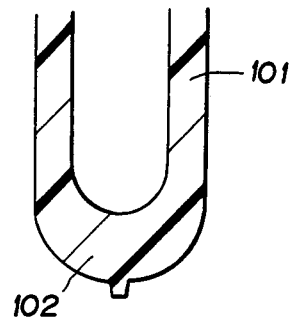
FIG. 13 is a longitudinal section of the bottom wall of the parison shown in FIG. 11.
Figure 14:
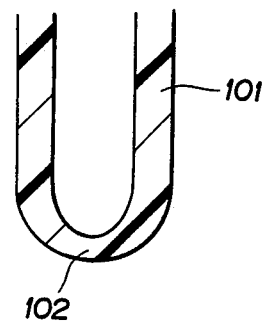
FIG. 14 is a longitudinal section of the bottom in the state wherein the bottom wall of the parison shown in FIG. 11 is made thin.

Accordingly, when the parison 1 is produced, a resin material which is heat-molten is injected into the cavity C of the mold 6 through the gate 63 from the injection molding machine and charged therein. After the resin material has been injected, the resin material in the cavity C is hardened by cooling. In this case, the bottom wall 3 of the parison 1 is partially made thin only in the padding portion 5 and has a surface area greater than that of the conventional parison 1 shown in FIG. 13 and exhibits a high cooling efficiency. Therefore, since the time of hardening by cooling is short, it is possible to shorten the processing cycle from charge of a resin material to release from the mold, to increase the number of the parisons 1 produced for a given time, and to increase productivity.

It is also possible to reduce the amount of the resin material required for molding one parison 1 as compared with the conventional parison 1 and to attempt to reduce the material cost.

Although the sprue 7 corresponding to the gate 63 is formed on the external periphery of the bottom wall 3 of the parison 1 injection-molded, the size of the sprue 7 depends upon the size and the shape of the parison 1 and is made as small as possible. The diameter of the padding portion 5 formed on the internal periphery of the bottom wall 3 of the parison 1 is greater than that of the sprue 7.

A description will now be made of a process of blow molding of the vessel B using the above-mentioned parison 1 on the basis of FIGS. 5 and 6. In the drawings, a mold 8 used for blow molding comprises a split mold 81 for substantially molding the barrel portion B1 of the vessel B, bottom mold 82 for molding the bottom B2 of the vessel and a neck mold 83 for molding the neck portion B3 of the vessel B. A stretching rod 9 for stretching the parison in the axial direction X thereof is inserted into the parison 1 mounted in the mold 8 from the neck portion B3 by a drive source (not shown) in such a manner that it can be projected and retracted. In addition, a fluid passage 10 through which a fluid such as compressed air is passed is provided between the stretching rod 9 and the internal surface of the parison 1.

The blow molding in the above-described apparatus is performed by the method described below.

The parison 1 heated at an appropriate temperature is first mounted in the mold 8, as shown in FIG. 5. The parison 1 is then stretched by blowing a compressed fluid in the fluid passage 10 while the stretching rod 9 being extended until the bottom wall 3 of the parison 1 contacts with the bottom mold 82. At this time, it is desirable that the sprue 7 which corresponds to the gate 63 and projects from the external periphery of the bottom wall 3 during injection molding of the parison 1 is previously removed, but the burr 7 may be processed during blow molding.

During stretching by the stretching rod 9, the compressed air is sent into the parison 1 under stretching through a blowing hole 11 provided on the stretching rod 9 so that any adhesion between the parison 1 and the stretching rod 9 is prevented. At this time, the side wall 2 of the parison 1 is mainly stretched in the axial direction.

As shown in FIG. 6, the compressed air is then blown in the parison 1 through the fluid passage 10 under high pressure so that the side wall 2 of the parison 1 is outwardly expanded in the radial direction and adhere to the inner surface of the mold 8. On the other hand, the bottom wall 3 is also expanded outward in the radial direction from its center 0 while being made thin so that the outer surface thereof is adhered to the inner surface of the bottom mold 82.

Figure 7A:
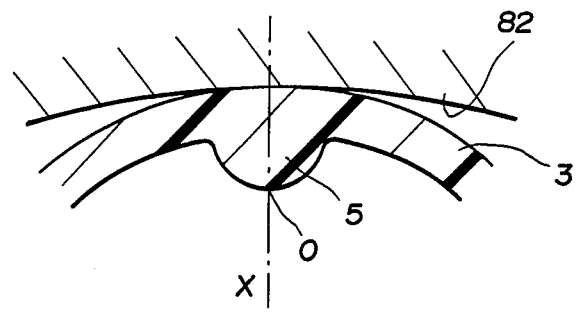
FIGS. 7(A) to 7(C) are schematic partial sections of various states o the bottom wall of the parison stretched during blow molding.
Figure 7B:
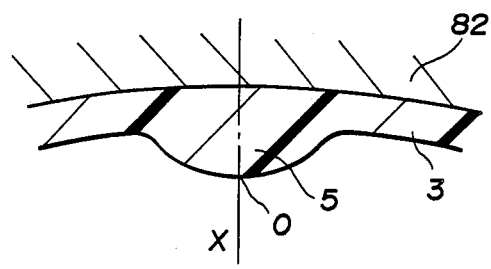
Figure 7C:
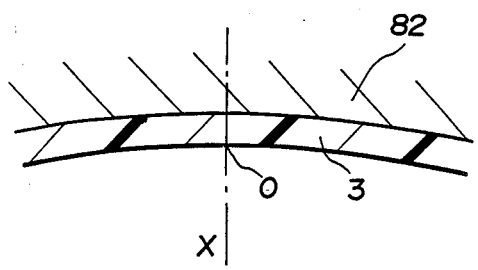
Figure 8:
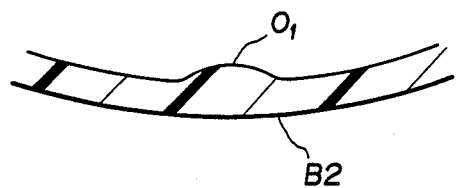
FIG. 8 is a longitudinal sectional view of the state of the bottom of the vessel after blow molding.
Figure 9:
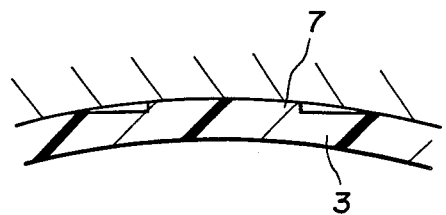
FIG. 9 is a partial longitudinal section of the bottom showing the state of the stretched burr which projects from the bottom wall of the parison.
Figure 15:
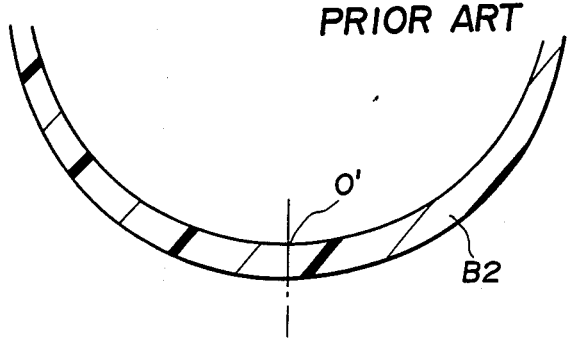
FIG. 15 is a longitudinal section of the bottom which exaggeratingly shows the thickness of the bottom of the vessel obtained by blow molding using a conventional parison.
Figure 16:
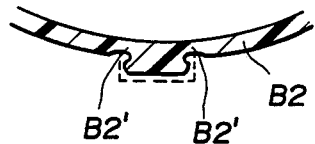
FIG. 16 is a longitudinal section of the bottom of the vessel obtained by blow molding using the prison shown in FIG. 14.

In other wards, the padding portion 5 provided on the inner surface of the bottom wall 3 is outwardly expanded in the radial direction thereof as the bottom wall 3 is made thin, as shown in FIGS. 7(A) to 7(C). Therefore, as shown in FIG. 8, after blow molding has been completed, the thickness of the bottom B2 of the vessel B is uniform over the vicinity of the center $O_1$ which are generally made the most thin, as compared with the conventional vessel shown in FIG. 15. Consequently, the thickness of the vessel B is uniform over the range from the barrel portion B1 to the bottom B2, and any decrease in strength of the bottom B2 of the vessel B can be thus prevented.

Since the sprue 7 projecting from the external periphery of the bottom wall 3 is made as small as possible, if the vessel B is blow-molded, the burr 7 is only slightly extended to be made flat and has substantially no effect on the uniformalization of the thickness of the bottom B2 of the vessel B.

Figure 10:
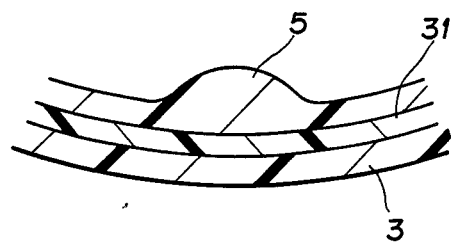
FIG. 10 is a partial longitudinal section of a parison having a laminated structure.

When the vessel B is used as a food container and the like, a container having the laminated structure shown in FIG. 10 comprising a gas barrier material such as EVAL (ethylene-vinyl alcohol copolymer) serving as an intermediate layer 31 and PET (polyethylene terephthalate) layers provided on the both sides of the intermediate layer is used, but the vessel B of the present invention can be applied to such a laminated structure.

What is claimed is:

1. A parison for stretch molding said parison being produced by injection molding and having a central axis, said parison comprising a sidewall which forms a barrel portion of a hollow vessel during blow molding, said side wall being radially spaced from and surrounding said central axis, a bottom wall which continues from said side wall and forms a bottom wall of said vessel during said blow molding, said bottom wall having an internal periphery and an external periphery, and a padding portion which is gradually made thin outward in the radial direction substantially from a central portion of said bottom wall and which is provided in the internal periphery of said bottom wall;

wherein said padding portion has a circular cross-section in a plane perpendicular to said central axis with said circular cross-section having a maximum diameter d adjacent said internal periphery of said bottom wall;

said parison being further provided with a burr portion produced during said injection molding, said burr being located at said central portion of said bottom wall on the external periphery of said bottom wall, said burr having a circular cross-section in a plane perpendicular to said central axis, with said circular cross-section having a maximum diameter D;

wherein said maximum diameter d of said padding circular cross-section is greater than the maximum diameter D of said burr circular cross-section.

2. A parison for stretch molding according to claim 1 wherein said padding has a thickness at the central portion parallel to said central axis which is smaller than a thickness of the thickest portion of said parison.

* * * * *